United States Patent
Narita et al.

(10) Patent No.: US 9,206,768 B2
(45) Date of Patent: Dec. 8, 2015

(54) METHOD AND APPARATUS FOR DETERMINING ABNORMALITY IN EXHAUST GAS RECIRCULATION AMOUNT

(75) Inventors: Hironori Narita, Hino (JP); Munechika Tsutsumi, Hino (JP); Hitoshi Nakano, Hino (JP)

(73) Assignee: HINO MOTORS, LTD., Hino-shi (JP)

( * ) Notice: Subject to any disclaimer, the term of this patent is extended or adjusted under 35 U.S.C. 154(b) by 172 days.

(21) Appl. No.: 14/131,608

(22) PCT Filed: Jul. 9, 2012

(86) PCT No.: PCT/JP2012/004419
§ 371 (c)(1),
(2), (4) Date: Jan. 8, 2014

(87) PCT Pub. No.: WO2013/008444
PCT Pub. Date: Jan. 17, 2013

(65) Prior Publication Data
US 2014/0144219 A1 May 29, 2014

(30) Foreign Application Priority Data
Jul. 11, 2011 (JP) ................................ 2011-152873

(51) Int. Cl.
*G01M 15/10* (2006.01)
*F02M 25/07* (2006.01)
(Continued)

(52) U.S. Cl.
CPC ....... *F02M 25/0702* (2013.01); *F02D 41/0072* (2013.01); *F02D 41/0077* (2013.01); *F02D 41/22* (2013.01); *F02D 2041/0075* (2013.01); *F02D 2200/0402* (2013.01); *F02D 2200/0406* (2013.01); *F02D 2200/0414* (2013.01);
(Continued)

(58) Field of Classification Search
CPC ..... G01M 15/10; F02D 41/0072; F02D 41/22
USPC .......................................... 73/114.69, 114.74
See application file for complete search history.

(56) References Cited

U.S. PATENT DOCUMENTS 4,715,348 A    12/1987   Kobayashi et al.
4,974,572 A *   12/1990   Aramaki .................... 73/114.74
(Continued)

FOREIGN PATENT DOCUMENTS

DE    10 2008 008 533 A1    8/2009
EP         1 467 076 A2    10/2004
(Continued)

OTHER PUBLICATIONS

Extended European Search Report issued Mar. 6, 2015 in Patent Application No. 12811267.9.
(Continued)

*Primary Examiner* — Eric S McCall
(74) *Attorney, Agent, or Firm* — Oblon, McClelland, Maier & Neustadt, L.L.P.

(57) ABSTRACT

An absolute value of a deviation of an actual EGR ratio, calculated in a current operational status of an engine 1, from a target EGR ratio set on the basis of current operational status of the engine 1 is acquired and is multiplied by a quotient, as gain, acquired from division of a feedback correction amount of opening degree of an EGR valve 12 by an upper limit of the feedback correction amount to determine normality when an acquired product is close to "0" and determine higher degree of abnormality the further the product is away from "0".

3 Claims, 3 Drawing Sheets

(51) Int. Cl.
*F02D 41/00* (2006.01)
*F02D 41/22* (2006.01)

(52) U.S. Cl.
CPC ........ *F02M25/0707* (2013.01); *F02M 25/0713* (2013.01); *F02M 25/0731* (2013.01); *Y02T 10/47* (2013.01)

(56) References Cited

U.S. PATENT DOCUMENTS

| | | | |
|---|---|---|---|
| 5,918,582 A * | 7/1999 | Itoyama et al. | 123/568.29 |
| 5,964,820 A * | 10/1999 | Miwa et al. | 701/108 |
| 6,076,502 A | 6/2000 | Katashiba et al. | |
| 2001/0035172 A1 * | 11/2001 | Osaki et al. | 123/568.16 |
| 2006/0196485 A1 | 9/2006 | Kimura | |
| 2007/0074707 A1 * | 4/2007 | Ogawa et al. | 123/568.14 |
| 2011/0231078 A1 * | 9/2011 | Nagoshi | 701/102 |
| 2014/0251287 A1 * | 9/2014 | Takezoe | 123/568.11 |
| 2015/0101564 A1 * | 4/2015 | Surnilla et al. | 123/294 |

FOREIGN PATENT DOCUMENTS

| | | |
|---|---|---|
| JP | 8 291770 | 11/1996 |
| JP | 10 141150 | 5/1998 |
| JP | 10 266901 | 10/1998 |
| JP | 2003 161207 | 6/2003 |
| JP | 2011 89470 | 5/2011 |

OTHER PUBLICATIONS

International Search Report Issued Oct. 9, 2012 in PCT/JP12/04419 Filed Jul. 9, 2012.

* cited by examiner

F I G. 1
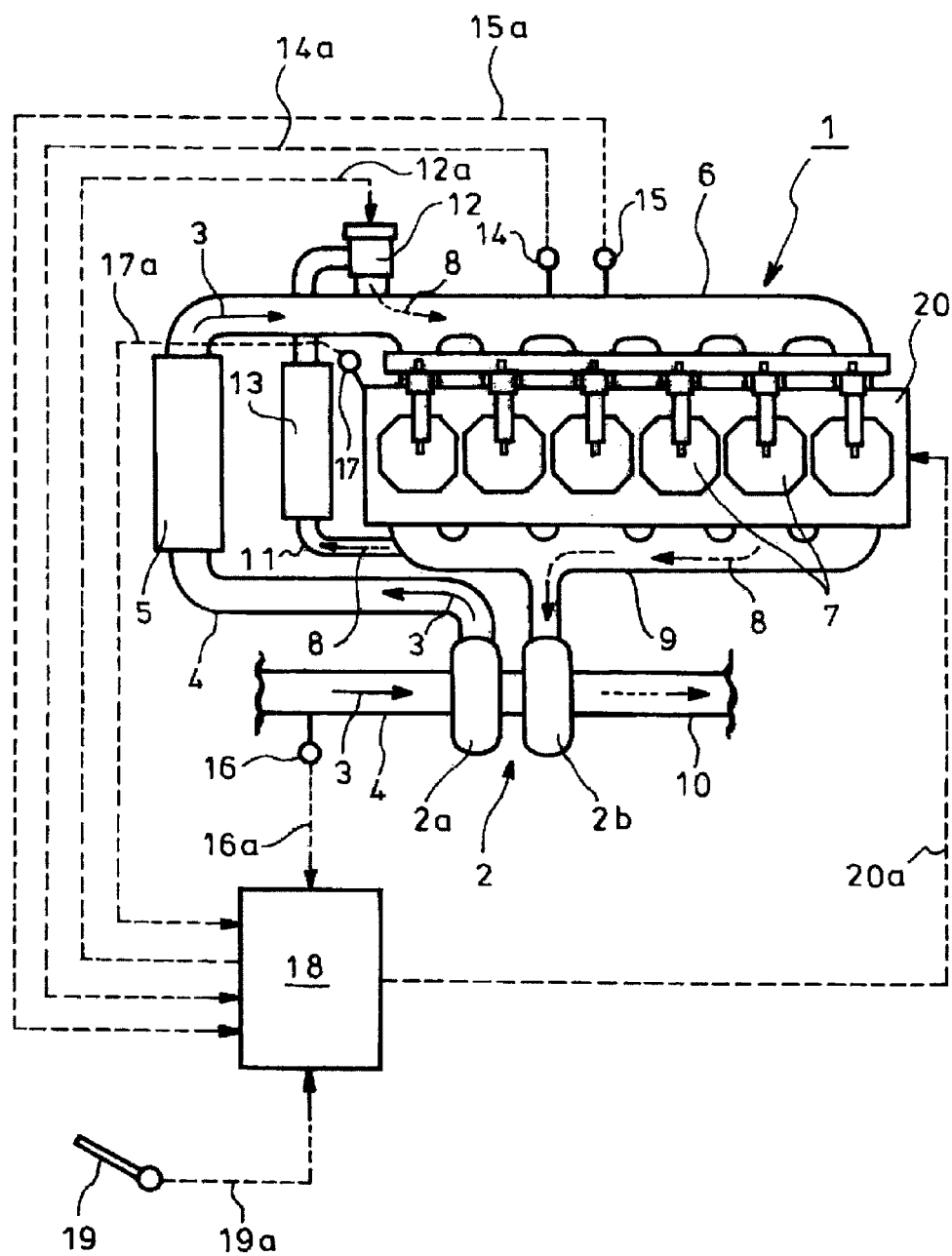

METHOD AND APPARATUS FOR DETERMINING ABNORMALITY IN EXHAUST GAS RECIRCULATION AMOUNT

TECHNICAL FIELD

The present invention relates to a method and apparatus for determining abnormality in exhaust gas recirculation amount in, for example, a vehicle engine.

BACKGROUND ART

Conventionally, so-called exhaust gas recirculation (EGR) has been conducted in, for example, a vehicle engine in which part of exhaust gas is extracted from an exhaust side and is returned to an intake side. The exhaust gas returned to the intake side suppresses combustion of fuel in the engine, thereby lowering combustion temperature to reduce $NO_x$ generated.

Generally, in order to conduct such kind of exhaust gas recirculation, an EGR pipe connects an appropriate position in an exhaust passage, extending from an exhaust manifold to an exhaust pipe, with an appropriate position in an intake passage, extending from an intake pipe to an intake manifold, whereby the exhaust gas is recirculated through the EGR pipe.

The EGR pipe may be equipped with, midway thereof, a water-cooled EGR cooler since cooling, in a mid part of the EGR pipe, of the exhaust gas to be recirculated to the engine will drop a temperature of and reduce a volume of the exhaust gas to lower a combustion temperature without substantial decrease in output of the engine, thereby effectively suppressing generation of nitrogen oxides.

There is, for example, a fear in the EGR cooler that a heat-exchanger tube may be clogged by deposition of soot entrained in the exhaust gas. Such clog may result in failed recirculation of the exhaust gas in an intended amount, leading to unattainment of a target EGR ratio. Such abnormal situation of the unattained target EGR ratio is required to determine by any way.

There exists, for example, the following Patent Literature 1 as a prior art literature pertinent to the invention.

CITATION LIST

Patent Literature

[Patent Literature 1] JP 2003-161207A

SUMMARY OF INVENTION

Technical Problems

However, in recent vehicle engines for which downsizing and elevated Pme (elevated mean effective pressure) are promoted to improve fuel efficiency, disadvantageously, it is extremely difficult to develop a sensor which can withstand high-temperature and high-pressure conditions to directly detect a recirculation amount of exhaust gas; even if it were possible to do so, substantial increase in cost would be unavoidable.

The invention was made in view of the above and has its object to enable determination of abnormality in recirculation amount of exhaust gas with high accuracy and without newly adding a special sensor capable of directly detecting the recirculation amount of the exhaust gas.

Solution to Problems

The invention is directed to a method for determining abnormality in an exhaust gas recirculation amount, characterized by acquiring an absolute value of a deviation of an actual EGR ratio, calculated in a current engine operational status, from a target EGR ratio set on the basis of the current engine operational status, multiplying said absolute value of the deviation by a quotient, as gain, acquired from division of a feedback correction amount of opening degree of an EGR valve by an upper limit of said feedback correction amount, and determining normality when an acquired product is close to "0" and determining higher degree of abnormality the further said product is away from "0".

Thus, in this manner, without newly adding a special sensor capable of directly detecting the recirculation amount of the exhaust gas, the absolute value of the deviation of the actual EGR ratio from the target EGR ratio may be acquired on the basis of various information already used for current engine control to grasp a rate of deviation of the actual EGR ratio from the target EGR ratio.

The actual EGR ratio may be calculated, for example, by calculating an amount per unit time of working gas which respective cylinders can take in on the basis of a temperature and a pressure of an intake manifold and a rotational speed of an engine, measuring an amount per the same unit time of fresh air flowing through an intake pipe, subtracting said fresh air amount from said working gas amount to acquire a recirculation amount of the exhaust gas, and dividing said recirculation amount by said working gas amount to acquire the actual EGR ratio.

The target EGR ratio may be set such that, on the basis of current rotational speed and load of the engine, the target EGR ratio matching the current operational status is read out from a control table.

If an absolute value of a deviation of the actual EGR ratio from the target EGR ratio is acquired to reveal a great deviation of the actual EGR ratio from the target EGR ratio, it may be determined that recirculation of the exhaust gas in an intended amount is impracticable due to, for example, clogging of a heat-exchanger tube for an EGR cooler.

However, it is feared that, upon use of an engine in a highland or other environment with lower air density where fresh air required for ensured satisfactory combustion may quantitatively lack (filling efficiency of the fresh air in terms of mass may lower), taken is action of lowering the target EGR ratio depending on an altitude (measured by, for example, an altimeter) so as to ensure a required amount of fresh air. The target EGR ratio lowered depending on the altitude may be close to the actual EGR ratio upon abnormality lowered due to, for example, clogging of the heat-exchanger tube for the EGR cooler, so that the absolute value of the deviation of the actual EGR ratio from the target EGR ratio upon abnormality may have no remarkable difference from that upon normality, leading to difficulty in determining whether the recirculation amount of the exhaust gas is normal or abnormal.

Then, if the absolute value of the deviation is multiplied by a quotient, as gain, acquired from division of the feedback correction amount of opening degree of the EGR valve by an upper limit of the feedback correction amount, then a product is acquired as new indicator for remarkable difference between normality and abnormality, which facilitates determination of whether the recirculation amount of the exhaust gas is normal or abnormal.

More specifically, the quotient acquired from the division of the feedback correction amount of opening degree of the EGR valve by the upper limit of the feedback correction amount is a value representative of a degree of the feedback control. Upon normality where no feedback control is required, the quotient is a value close to "0" whereas, upon striking abnormality where the feedback control up near to its upper limit is required, the quotient is a value close to "1".

Thus, in the multiplication of the absolute value of the deviation by the quotient as non-dimensional gain, the product converges with substantially "0" upon normality whereas upon a higher degree of abnormality, the product is a value not substantially different from the absolute value of the deviation of the actual EGR ratio from the target EGR ratio, which facilitates determination of whether the recirculation amount of the exhaust gas is normal or abnormal.

An apparatus for specifically conducting the method of the invention preferably comprises a temperature sensor for detecting temperature in an intake manifold, a pressure sensor for detecting pressure in an intake manifold, an intake sensor for detecting an amount of fresh air flowing through an intake pipe, a rotation sensor for detecting a rotational speed of an engine, a load sensor for detecting a load of the engine, and a controller to which the various sensors input detection signals so as to determine abnormality in recirculation amount of the exhaust gas, said controller being configured to calculate an amount per unit time of working gas which respective cylinders can take in on the basis of temperature and pressure of the intake air in the intake manifold and rotational speed of the engine, subtract an amount per the same unit time of fresh air flowing through the intake pipe from said working gas amount to acquire a recirculation amount of the exhaust gas, acquire an absolute value of a deviation of an actual EGR ratio, acquired through division of said recirculation amount by said working gas amount, from a target EGR ratio set on the basis of current rotational speed and load of the engine, multiply the absolute value of said deviation by a quotient, as gain, acquired from division of a feedback correction amount of opening degree of an EGR valve by an upper limit of said feedback correction amount, and determine normality when an acquired product is close to "0" and determine higher degree of abnormality the further said product is away from "0".

Advantageous Effects of Invention

A method and apparatus for detecting abnormality in an exhaust gas recirculation amount of the invention as mentioned in the above can exhibit excellent effects that, without newly adding a specific sensor capable of directly detecting a recirculation amount of the exhaust gas, an absolute value of a deviation of an actual EGR ratio from a target EGR ratio is acquired on the basis of various information already used in current engine control and is multiplied by a quotient, as gain, acquired from division of a feedback correction amount of opening degree of an EGR valve by an upper limit of the feedback correction amount; and thus, a product can be acquired as new indicator for remarkable difference between normality and abnormality, whereby determination of whether the recirculation amount of the exhaust gas is normal or abnormal can be reliably conducted.

BRIEF DESCRIPTION OF DRAWINGS

FIG. 1 is a schematic view showing an embodiment of the invention;

DESCRIPTION OF EMBODIMENT

Figure 2:
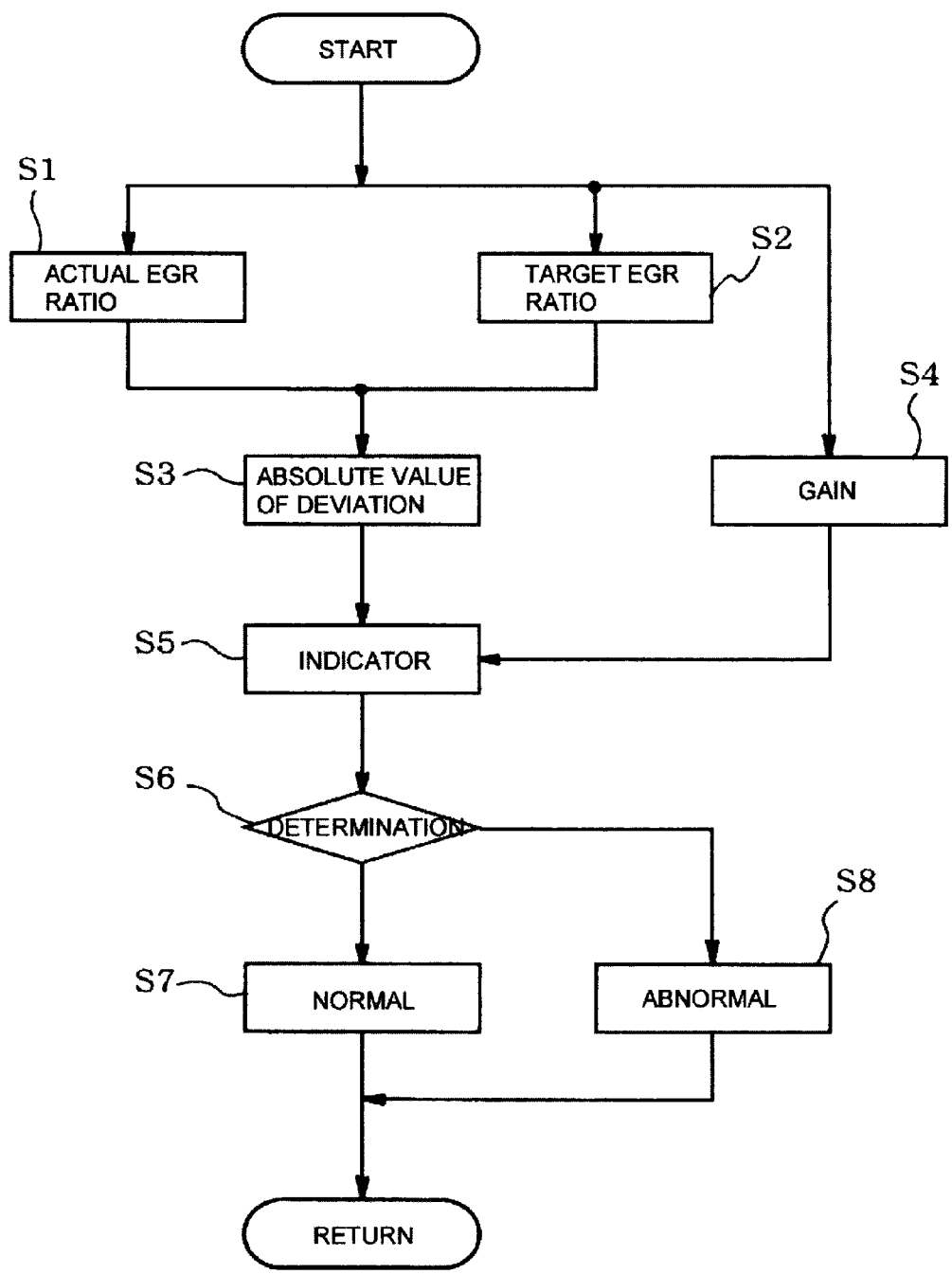
FIG. 2 is a flowchart showing a specific control procedure for the controller of FIG. 1.

An embodiment of the invention will be described in conjunction with the drawings.

FIG. 1 shows an example of an engine with an EGR device for exhaust gas recirculation. In FIG. 1, reference numeral 1 denotes a diesel engine with a turbocharger 2. Intake air 3 introduced from an air cleaner (not shown) is led through an intake pipe 4 to a compressor 2a of the turbocharger 2. The intake air 3 pressurized by the compressor 2a is led to an intercooler 5 where it is cooled. The intake air 3 is further led from the intercooler 5 to an intake manifold 6 and is distributed to respective cylinders 7 of the engine 1 (exemplarily illustrated in FIG. 1 is a case with inline six cylinders).

An exhaust gas 8 discharged from the respective cylinders 7 of the engine 1 is led via an exhaust manifold 9 to a turbine 2b of the turbocharger 2 where the exhaust gas 8 drives the turbine 2b and is discharged outside of a vehicle via an exhaust pipe 10.

An EGR pipe 11 connects an end of the exhaust manifold 9 in an arrangement direction of the cylinders 7 with an end of the intake pipe 4 connected to the intake manifold 6 so as to extract part of the exhaust gas 8 from the exhaust manifold 9 into the intake pipe 4.

The EGR pipe 11 is provided with a properly openable and closable EGR valve 12 and an EGR cooler 13 for cooling of the exhaust gas 8 to be recirculated. In the EGR cooler 13, cooling water (not shown) is heat-exchanged with the exhaust gas 8 through a heat-exchanger tube (not shown) so as to lower a temperature in the exhaust gas 8.

The intake manifold 6 is provided with temperature and pressure sensors 14 and 15 for measurement of temperature and pressure in the intake manifold 6, respectively. The intake pipe 4 is provided, at a position upstream of the compressor 2a, with an intake sensor 16 so as to detect an amount of fresh air flowing through the intake pipe 4; and the engine 1 is provided, at a required position thereof, with a rotation sensor 17 for detection of a rotational speed of the engine 1. The temperature, pressure, intake and rotation sensors 14, 15, 16 and 17 have detection signals 14a, 15a, 16a and 17a, respectively, which are input to a controller 18 serving as engine-control computer (ECU: Electronic Control Unit).

In the controller 18, an amount (mass flow rate) of working gas which the respective cylinders 7 can take in per unit time is calculated on the basis of the temperature and pressure in the intake manifold 6 and the rotational speed of the engine 1 while an amount (mass flow rate) of fresh air flowing through the intake pipe 4 per the same unit time is subtracted from the working gas amount to thereby acquire a recirculation amount of the exhaust gas 8, the recirculation amount being divided by the working gas amount to thereby acquire an actual EGR ratio.

More specifically, since the volume of the cylinders 7 is fixed, determination of the rotation speed of the engine 1 reveals a volumetric flow rate per unit time of the working gas which the respective cylinders 7 can take in, which may be converted into a mass flow rate and corrected in terms of the temperature and pressure in the intake manifold 6 to thereby acquire the working gas amount (mass flow rate). It is to be noted in this connection that an existing intake sensor 16 in general has a built-in temperature sensor which outputs a mass flow rate of fresh air.

Input to the controller 18, which is responsible also for control in relation to fuel injection in the engine 1, are not only a detection signal 17a from a rotation sensor 17 but also a detection signal 19a from an accelerator sensor 19 (load sensor) which detects an accelerator opening degree as a load of the engine 1. On the basis of the rotational speed and the load of the engine 1, a control signal 20a is output to a fuel injection device 20 which injects fuel to the respective cylinders 7 of the engine 1.

The fuel injection device 20 is constituted by a plurality of injectors (not shown) each for each of the cylinders 7. Electromagnetic valves each for each of the injectors are valve-opening controlled by the control signal 20a to properly control fuel injection timing and amount.

In this connection, a directed value of injection amount of the fuel injection control is regarded as load of the engine 1; and on the basis of the load and the rotational speed of the engine 1, a target EGR ratio matching the current operational status is read out from a control table. In order to attain such target EGR ratio, output to the EGR valve 12 is a control signal 12a for direction of opening degree. The above-mentioned actual EGR ratio is monitored to make feedback control on the opening degree of the EGR valve 12 so as to attain the target EGR ratio.

In the embodiment, the controller 18 also serves to determine the abnormality in recirculation amount of the exhaust gas 8. A specific procedure for determination of the abnormality in the controller 18 is as shown in the flowchart of FIG. 2.

More specifically, in step S1, an amount of the working gas which the respective cylinders 7 can take in per unit time is calculated on the basis of the temperature and pressure in the intake manifold 6 and the rotational speed of the engine 1, and an amount of fresh air flowing through the intake pipe 4 per the same unit time is subtracted from the working gas amount to thereby acquire a recirculation amount of the exhaust gas 8. The recirculation amount is divided by the working gas amount to acquire an actual EGR ratio.

In step S2, a target EGR ratio is acquired on the basis of the current rotational speed and load (directed value of injection amount in fuel injection control) of the engine 1. Acquired in next step S3 is an absolute value of a deviation of the actual EGR ratio acquired in the previous step S1 from the target EGR ratio acquired in the previous step S2.

Further, in step S4, a feedback correction amount of opening degree of the EGR valve 12 determined by the feedback control relating to the opening degree of the above-mentioned EGR valve 12 is divided by an upper limit of the feedback correction amount to acquire a quotient. In next step S5, the absolute value of the deviation acquired in the previous step S3 is multiplied by the quotient acquired in the previous step S4 as gain; and a product is acquired as indicator for determining abnormality of the recirculation amount of the exhaust gas 8.

Then, in next step S6, when the product acquired in the previous step S5 is close to "0", the procedure proceeds to step S7 where it is determined normal. When the product is away from "0", the procedure proceeds to step S8 where it is determined abnormal. The further the product is away from "0", it can be determined higher degree of abnormality; therefore, a suitable threshold may be set to determine abnormality when the threshold is exceeded.

Figure 3:
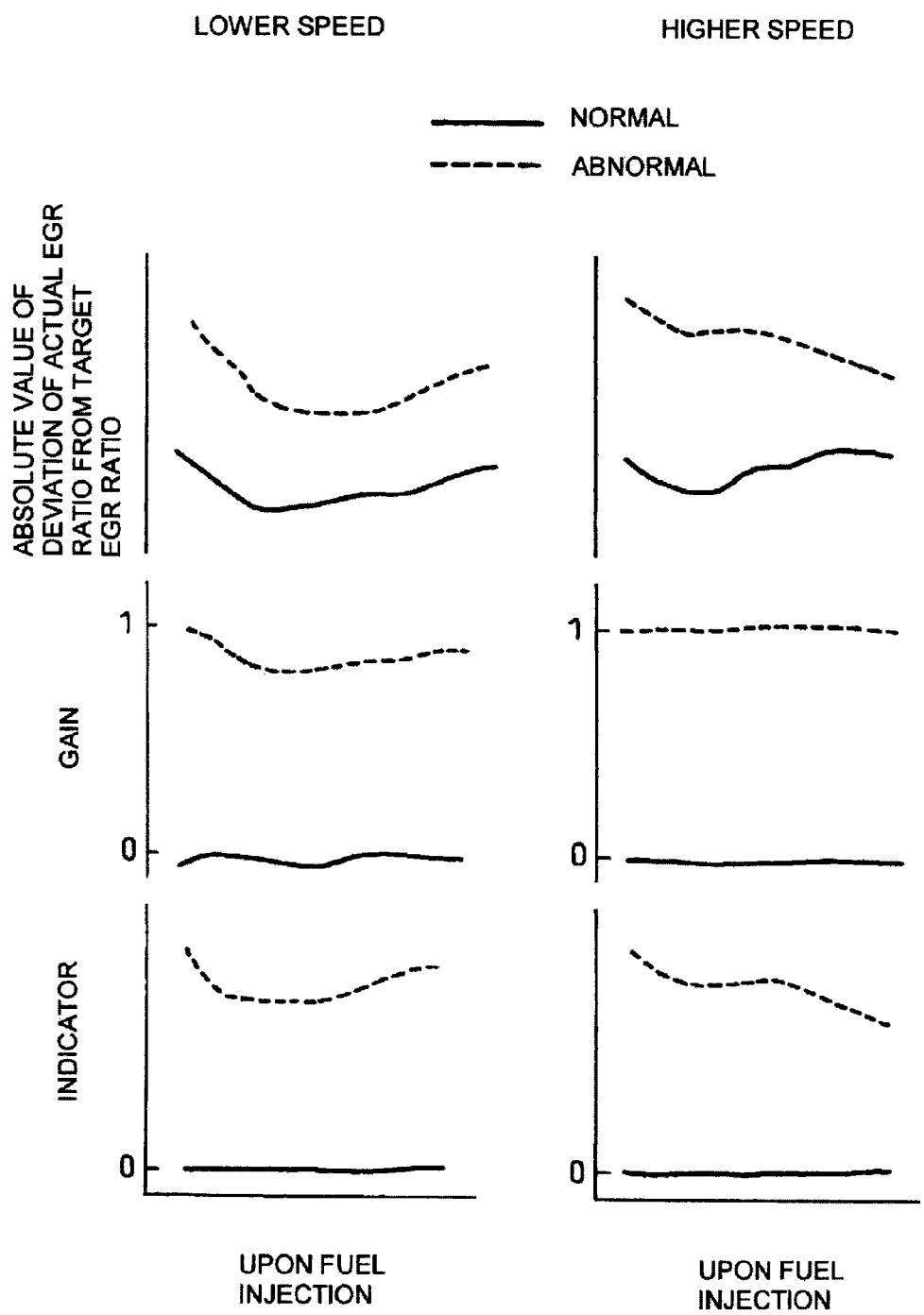
FIG. 3 is a graph showing specific examples of various values calculated by the controller of the embodiment.

Thus, in this way, without newly adding a special sensor for direct detection of the recirculation amount of the exhaust gas 8 and by acquiring the absolute value of the deviation of the actual EGR ratio from the target EGR ratio on the basis of various information currently used in engine control, a rate of deviation of the actual EGR ratio from the target EGR ratio may be grasped (see FIG. 3). That is, when the actual EGR ratio greatly deviate from the target EGR ratio, it may be determined that the recirculation of the exhaust gas 8 in the intended amount is impracticable due to, for example, clogging of the heat-exchanger tube for the EGR cooler 13.

However, upon use of the engine 1 in a highland or other environment with lower air density where fresh air required for ensured satisfactory combustion may quantitatively lack (filling efficiency of the fresh air in terms of mass may lower), taken is action of lowering the target EGR ratio depending on an altitude (measured by, for example, an altimeter) so as to ensure a required amount of fresh air. The target EGR ratio lowered depending on the altitude may be close to the actual EGR ratio upon abnormality lowered due to, for example, clogging of the heat-exchanger tube for the EGR cooler 13. So that the absolute value of the deviation of the actual EGR ratio from the target EGR ratio upon abnormality may have no remarkable difference from that upon normality, leading to difficulty in determining whether the recirculation amount of the exhaust gas 8 is normal or abnormal.

Then, if the absolute value of the deviation is multiplied by a quotient, as gain, acquired from division of the feedback correction amount of opening degree of the EGR valve 12 by an upper limit of the feedback correction amount, then a product is acquired as new indicator for remarkable differences between normality and abnormality, which facilitates determination of whether the recirculation amount of the exhaust gas 8 is normal or abnormal.

More specifically, the quotient acquired from the division of the feedback correction amount of opening degree of the EGR valve 12 by the upper limit of the feedback correction amount is a value representative of a degree of the feedback control. Upon normality where no feedback control is required, the quotient is a value close to "0" whereas, upon striking abnormality where feedback control up near to its upper limit is required, the quotient is a value close to "1" (see FIG. 3).

Thus, in the multiplication of the absolute value of the deviation by the quotient as non-dimensional gain, a product converges with substantially "0" upon normality whereas upon a higher degree of abnormality, the product is a value not substantially different from the absolute value of the deviation of the actual EGR ratio from the target EGR ratio, which facilitates determination of whether the recirculation amount of the exhaust gas 8 is normal or abnormal (see FIG. 3).

Thus, according to the above embodiment, without newly adding a special sensor capable of directly detecting the recirculation amount of the exhaust gas 8, the absolute value of the deviation of the actual EGR ratio from the target EGR ratio is acquired on the basis of various information on current engine control and is multiplied by a quotient, as gain, acquired from division of a feedback correction amount of opening degree of the EGR valve 12 by an upper limit of the feedback correction amount; and a product can be acquired as new indicator for providing remarkable difference between normality and abnormality, whereby determination of whether the recirculation amount of the exhaust gas 8 is normal or abnormal can be reliably conducted.

It is to be understood that a method and an apparatus for detecting abnormality in exhaust gas recirculation amount according to the invention is not limited to the above embodiment and that various changes and modifications may be made without departing from the scope of the invention. For example, though the explanation has been made on a situation where recirculation of exhaust gas in an intended amount is impracticable due to, for example, clogging of a heat-exchanger tube for an EGR cooler; however, the invention may determine abnormality of excessive recirculation amount of exhaust gas due to, for example, locking of a turbine with opening degree of a nozzle being over-throttled in an engine which uses as a turbocharger a variable nozzle turbo capable of controlling the nozzle opening degree in the turbine.

REFERENCE SIGNS LIST 1 engine
3 intake air
4 intake pipe
6 intake manifold
7 cylinder
8 exhaust gas
12 EGR valve
14 temperature sensor
14a detection signal
15 pressure sensor
15a detection signal
16 intake sensor
16a detection signal
17 rotation sensor
17a detection signal
18 controller
19 accelerator sensor (load sensor)
19a detection signal

The invention claimed is:

1. A method for determining abnormality in an exhaust gas recirculation amount, comprising acquiring an absolute value of a deviation of an actual EGR ratio, calculated in a current engine operational status, from a target EGR ratio set on the basis of the current engine operational status, multiplying said absolute value of the deviation by a quotient, as gain, acquired from division of a feedback correction amount of opening degree of an EGR valve by an upper limit of said feedback correction amount, and determining normality when an acquired product is close to "0" and determining higher degree of abnormality the further said product is away from "0".

2. The method for determining abnormality in an exhaust gas recirculation amount as claimed in claim 1, wherein the actual EGR ratio is acquired by calculating an amount per unit time of working gas which respective cylinders can take in on the basis of a temperature and a pressure of an intake manifold and a rotational speed of an engine, measuring an amount per the same unit time of fresh air flowing through an intake pipe, subtracting said fresh air amount from said working gas amount to acquire a recirculation amount of the exhaust gas, and dividing said recirculation amount by said working gas amount.

3. An apparatus for determining abnormality in an exhaust gas recirculation amount comprising a temperature sensor for detecting temperature in an intake manifold, a pressure sensor for detecting pressure in an intake manifold, an intake sensor for detecting an amount of fresh air flowing through an intake pipe, a rotation sensor for detecting a rotational speed of an engine, a load sensor for detecting a load of the engine, and a controller to which the various sensors input detection signals so as to determine abnormality in recirculation amount of the exhaust gas, said controller being configured to calculate an amount per unit time of working gas which respective cylinders can take in on the basis of temperature and pressure of the intake air in the intake manifold and rotational speed of the engine, subtract an amount per the same unit time of fresh air flowing through the intake pipe from said working gas amount to acquire a recirculation amount of the exhaust gas, acquire an absolute value of a deviation of an actual EGR ratio, acquired through division of said recirculation amount by said working gas amount, from a target EGR ratio set on the basis of current rotational speed and load of the engine, multiply the absolute value of said deviation by a quotient, as gain, acquired from division of a feedback correction amount of opening degree of an EGR valve by an upper limit of said feedback correction amount, and determine normality when an acquired product is close to "0" and determine higher degree of abnormality the further said product is away from "0".

* * * * *